United States Patent

[11] 3,607,338

[72] Inventors James E. Webb
Administrator of the National Aeronautics and Space Administration with respect to an invention of;
Daniel W. Gates, 3026 Crescent Circle, Huntsville, Ala.; Gene A. Zerlaut, 60 E. 32nd St., Chicago, Ill.; Frederick O. Rogers, 639 North Harney, Oak Park, Ill.
[21] Appl. No. 720,546
[22] Filed Apr. 11, 1968
[45] Patented Sept. 21, 1971

[54] SYNTHESIS OF ZINC TITANATE PIGMENT AND COATINGS CONTAINING THE SAME
2 Claims, 3 Drawing Figs.
[52] U.S. Cl..................................................... 106/292, 106/299
[51] Int. Cl...................................................... C09c 1/36, C09c 1/04
[50] Field of Search........................................... 106/292, 299, 296; 23/55

[56] References Cited
UNITED STATES PATENTS
| | | | |
|---|---|---|---|
| 3,364,065 | 1/1968 | Cutright...................... | 106/84 |
| 2,140,235 | 12/1938 | Lederle et al................ | 106/296 |
| 2,379,019 | 6/1945 | McCord et al............... | 106/292 |
| 2,766,133 | 10/1956 | Marcot et al. ............... | 106/296 |
| 3,337,358 | 8/1967 | Vossen........................ | 106/292 |

Primary Examiner—James E. Poer
Attorneys—L. D. Wofford, Jr., G. T. McCoy and J. H. Beumer ABSTRACT: Zinc titanate pigment resistant to degradation of reflective properties upon exposure to ultraviolet radiation in vacuum is prepared by reacting zinc oxide with anatase titanium dioxide at a molar ratio of 2:1 and a temperature of at least 900° C. and contacting the product with a zinc oxide extractant solution. The pigment prepared by this process is combined with a suitable binder to produce degradation-resistant coatings.

FREDERICK O. ROGERS
GENE A. ZERLAUT
DANIEL W. GATES
INVENTOR.(S)

SYNTHESIS OF ZINC TITANATE PIGMENT AND COATINGS CONTAINING THE SAME

The invention described herein was made in the performance of work under a NASA contract and is subject to the provisions of Section 305 of the National Aeronautics and Space Act of 1958, Public Law 85—568 (72 Stat 435; 42 U.S.C. 2487).

BACKGROUND OF THE INVENTION

This invention relates to coating compositions and more particularly to zinc titanate pigment for spacecraft thermal control coatings.

The provisions of suitable reflective coatings is essential to long term operation of space vehicles and equipment. In the absence of a stable white coating or other less expedient protective measures, surfaces which are exposed to solar radiation would become overheated, largely because of absorption of sun input energy, and spacecraft equipment would malfunction upon exceeding its temperature limitations. In the case of manned spacecraft, the lack of a stable thermal control coating would necessitate additional refrigeration equipment and/or increased insulation to maintain a temperature suitable for astronaut survival. Coatings for such applications should exhibit a very low but stable ratio of solar absorptance ($\alpha_s$) to infrared remittance ($\epsilon$) along with favorable mechanical integrity and ease of application.

Numerous coatings similar to previously known paint compositions exhibit favorable reflective and emissive properties and stability for use under normal environmental conditions, but they are generally unsuitable for use in the space environment. Both the binder or vehicle and the pigment in conventional coating compositions are subject to degradation upon being exposed to ultraviolet radiation and a vacuum, these conditions existing in outer space. Most organic binder materials undergo a severe degradation of physical and chemical properties upon exposure to ultraviolet radiation, and the best white pigments, including unprotected zinc oxide and titanium dioxide, whether anatase or rutile, show a rapid decrease in reflectance in the visible and/or infrared regions as a result of simultaneous exposure to vacuum and ultraviolet. Discovery and measurement of the effects of pigment degradation have been complicated by the fact that the degraded pigment is restored to its original highly reflective state almost instantaneously upon exposure to air so that post-irradiation measurements fail to show any degradation unless they are made in situ.

Degradation of zinc oxide pigment can be minimized by treating it with an alkali metal silicate as described in pending application Ser. No. 644,449, filed June 2, 1967, now abandoned. However, no reproducible method has been available for preparing degradation zinc titanate pigment. Zinc titanate, and in particular the orthotitanate ($Zn_2TiO_4$) prepared by reacting two moles of zinc oxide with 1 mole of titanium dioxide, exhibits better whiteness and reflectivity than either of the oxides from which it is prepared, and it would provide significant advantage as a pigment for spacecraft thermal control coatings if it were available in degradation-resistant form.

SUMMARY OF THE INVENTION

In the present invention zinc orthotitanate pigment is prepared by reacting zinc oxide with titanium dioxide at a molar ratio of 2:1 at a temperature of at least 900° C. and contacting the product with a zinc oxide extractant solution. The pigment obtained by this process is consistently stable and resistant to degradation of reflective properties upon exposure to ultraviolet radiation in vacuum. When combined with a suitable ultraviolet-resistant binder, this pigment provides an effective and stable coating for space applications.

It is therefore an object of this invention to provide zinc titanate pigment resistant to degradation of reflective properties upon exposure to ultraviolet radiation in vacuum.

Another object is to provide a method of treating zinc titanate pigment to render it stable to ultraviolet radiation in vacuum.

Another object is to provide stabilized thermal control coatings for spacecraft.

Other objects and advantages will be apparent from the following detailed description and appended claims.

DESCRIPTION OF THE PREFERRED EMBODIMENT

Figure 1:
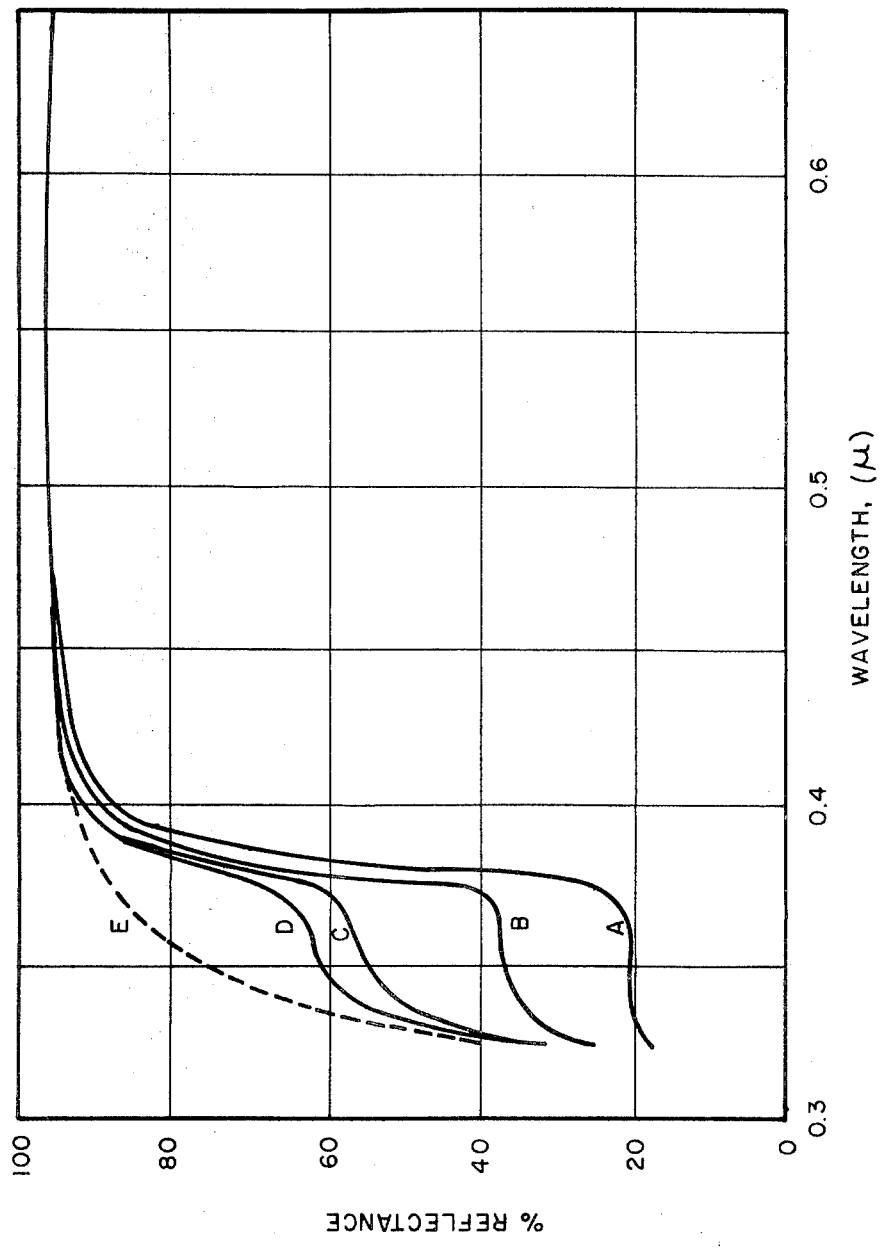
FIG. 1 is a graph showing reflectance spectra for zinc titanate samples heated at varying temperatures and extracted with acetic acid.

Zinc orthotitanate is prepared by reacting zinc oxide with anatase titanium dioxide at a molar ratio of 2:1 and a temperature over 900° C. Other forms of zinc titanate, the metatitanate ($ZnTiO_3$) and the sesquititanate ($Zn_2Ti_3O_8$) can be prepared by varying the temperature, molar ratio of reactants and/or the starting material. However, the reflective properties of the ortho form are far superior to the corresponding properties of the meta and sesqui forms.

The starting zinc oxide for use in preparing zinc titanate can be any finely divided zinc oxide pigment material. However, it is preferred to use zinc oxide having a high purity and an average particle size of about 0.2 to 1.5 microns. Commercially available zinc oxide designated "SP500" can be used.

The starting titanium dioxide can also be any finely divided pigment-type material. High purity is desirable since impurities may have adverse effects on titanate reflectance. The anatase form of titanium dioxide is preferred, although other forms such as rutile can also be used.

The zinc oxide and titanium oxide are combined at 2:1 mole ratio appropriate to formation of the orthotitanate. Substantial variations from this stoichiometry will render the produce less reflective or less resistant to degradation, owing to the presence of unreacted titanium dioxide and zinc oxide or other forms of zinc titanate. A slight excess such as up to 5 percent by weight of zinc oxide can be tolerated, however, since zinc oxide is removed in the subsequent extraction step.

An intimate mixture of zinc oxide and titanium can be obtained by separately slurrying each component in distilled water and mixing the two slurries. In this procedure the pH of the titanium dioxide slurry is preferably adjusted to a value of 8 to 9 by addition of ammonium hydroxide in order to match the pH of the zinc oxide slurry and neutralize any traces of acidity present in the sulfate-process anatase. The combined slurry is filtered and the filter cake is dried by mild heating, for example, heating at 100° C. for 3 hours in a forced air oven. The filter cake is then broken up by means such as mulling to produce a fine powder.

The zinc oxide-titanium oxide mixture is then reacted by heating to a temperature over 900° C. Zinc orthotitanate is formed at lower temperatures, but degradation resistance is poor, probably because of the presence of some incompletely converted titanium dioxide. For maximum reflectance and resistance to degradation a temperature of 900 to 1050° C. is preferred. The mixture is heated for a period of at least 6 hours, and 14 to 30 is preferred to ensure maximum conversion.

The zinc titanate obtained by this reaction is then contacted with a zinc oxide extractant solution in order to impart resistance to degradation. Although the invention is not to be understood as limited to a particular theory, it is believed that the improved degradation resistance results from removal of free zinc oxide in this step. Despite close control of reactant proportions and other reaction conditions, small amounts of unreacted zinc oxide are found in the product, and their removal by extraction stabilizes the pigment.

Any reagent which dissolves zinc oxide and which does not react with or dissolve zinc titanate can be used for this purpose, and an aqueous acetic acid solution is preferred. A suitable concentration of acetic acid is from 10 to 25 weight percent. Other reagents which can be used include formic acid and "ammonium hydroxide-ammonium chloride extraction liquid" which is an aqueous solution containing 20 percent ammonium hydroxide and 5 percent ammonium chloride. The pigment can be contacted with the extractant solution by slurrying in the solution, with a slurrying period of 14 hours or overnight being preferred.

After extraction of zinc oxide the zinc titanate is washed with distilled water, separated from the liquid phase by means such as filtration and dried, preferably by heating at a temperature of 100 to 120° C. for a period of about 20 hours. For maximum stability the dried pigment can be reheated to a temperature of about 650° C. in a clean crucible and furnace. If necessary the product can be ground by means such as dry grinding in a pebble mill. Grinding should be kept to a minimum, however, since it degrades the product.

In an alternative procedure the need for grinding is avoided by control of the initial zinc oxide-zinc titanate reaction temperature and by the use of a dispersion heat-treatment step after extraction of zinc oxide. In order to avoid the formation of hard agglomerates which require grinding, the initial reaction temperature is kept relatively low, and even below the temperature at which conversion to zinc orthotitanate is complete, a temperature of 800 to 950° C. being suitable. After extraction and drying as described above the pigment is heat treated at a temperature over 950° C. by exposing it to a controlled atmosphere, which can be an inert gas, in a manner such as to maintain dispersion and prevent agglomeration. A column apparatus wherein the pigment particles are suspended in a stream of heated gas can be used for this step. A temperature of 1000 to 1050° C. is preferred for maximum reflectance and resistance to degradation.

The product zinc titanate pigment is combined with a suitable binder or vehicle to produce a degradation-resistant coating. The binder a well as the pigment must be stable to ultraviolet radiation, and, as pointed out above, the organic resins used previously as binders for conventional coatings fail to exhibit the necessary stability. Silicone-type polymers, however, are stable to ultraviolet radiation, and they are available in the form of resins or elastomers particularly suitable for use as a coating binder. Examples of binders which can be used include polydimethylsiloxane elastomer having the general formula

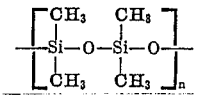

where $n$ is 5 to 30 and the molar ratio of methyl groups to silicon is 1.99 to 2.0, available commercially from the General Electric Company under the designation "RTV—602, " and polymethylsiloxane having the general formula

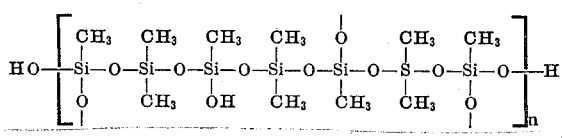

where $n$ is 3 to 30 and the molar ratio of methyl groups to silicone is 1.2 to 1.8, a suitable polymer of this type being available commercially from the Owens-Illinois Glass Company under the designation "OI—650 glass resin."

Other resins which are stable to ultraviolet radiation can also be used within the scope of the present invention. Previously known curing catalysts such as the amine catalyst available from General Electric Company under the designation "SRC—05" or tetramethyl guanidine for the methyl silicone elastomer given above can be used in small amounts for example, 0.005 to 1.0 weight percent of the binder, to enhance curing of the binder. In organic binders such as alkali metal silicates, exemplified by potassium silicate, can also be used.

An inert solvent or thinner is mixed with the binder and pigment to provide the desired consistency for application of the coating. For the silicone-type binders given above an organic solvent such as benzene, toluene, xylene or mixtures thereof can be used. Improved shelf life is obtained by using a mixed solvent system containing several components in addition to the primary solvent. For example, the preferred solvent system for use with a polydimethylsiloxane binder, in volume percent, is as follows: toluene, 40; xylene, 20; isopropanol, 20; butanol, 15; and butyl acetate, 5. Isopropanol or anhydrous ethanol can be substituted for isopropanol; normal propanol or methylisobutyl ketone for butanol; and isopropyl acetate or isobutyl acetate for butyl acetate. The relative proportions of the various solvent components can be varied within wide limits. A total solvent proportion of 40 to 60 volume percent of the liquid coating mixture is suitable in most cases. For alkali metal silicate binders water is employed as the solvent. The zinc titanate pigment can be provided in the coating composition at a pigment volume concentration, based on dried film volume, from 25 to 80 percent. For silicone binders a pigment volume concentration of 35 to 40 percent is preferred, and alkali metal silicate binders 65 to 75 is preferred.

Compositions suitable for application as a coating include the following components:

zinc titanate pigment  25 to 80 percent
(pigment volume concentration)
silicone binder, including one-eighth
to 2 percent curing catalyst  0 to 80 weight percent
alkali metal silicate  0 to 30 weight percent
inert organic solvents  0 to 35 weight percent
water  0 to 30 weight percent The silicone binder is used in combination with the organic solvents and the silicate in combination with water. A homogeneous mixture is obtained by means such as pebble milling of the combined ingredients Particular embodiments for coating applications include the following compositions:

Silicate-type Coating
Zinc titanate pigment—50 grams
Potassium silicate (35 weight percent solution available commercially as "PS—7"—25 cc.,
Distilled water  —25 cc.

This coating is prepared by wet grinding the pigment in the silicate solution and water from 1 to 3 hours in a clean jar mill with porcelain balls always below the liquid level. The surface to which the coating is applied should first be rendered "-water-loving" or "break-free" treatment with a degreaser such as a phosphate cleaner or trichloroethylene, sodium hydroxide or other etch solution, or a desmutting agent such as a solution of 15 weight percent nitric acid. In addition, a light sandblast can be used to promote best adherence.

Polydimethylsiloxane Coating
Zinc titanate pigment—29 lb.
Polydimethylsiloxane binder "RTV—602"—12 lb.
Mixed solvent system (preferred composition given above)—16 lb. The pigment volume concentration for this composition is 32.5 percent. This coating is prepared by wet ball milling for 3 to 5 hours. After milling, 0.4. percent "SRC—05" amine curing catalyst, based on the weight of the binder, is added. The surface to be coated should first be coated with a reactive silane primer such as the primer available from the General Electric Company under the designation "SS—4044."

"Glass Resin" Coating
Zinc titanate pigment—  40 volume percent
Resin solution  —  60 volume percent
Resin solution composition by volume percent
Owens-Illinois 650 glass resin, 28; butanol, 42;
isopropanol, 15; toluene, 9; 1 methylisobutyl ketone, 3;
Cellosolve, 3. The coating is prepared by wet ball milling for 2 to 3 hours. No primer or catalyst is needed, but the surface should be in "breakfree" condition.

The compositions prepared as described above can be applied by means of spraying or otherwise spreading them on the surface to be protected. These compositions cure to form a hard, tough coating in a period of 4 to 24 hours. The coating is applied at the thickness required for maximum solar reflectance, for example, at least 6 mils for a composition having a silicone binder and a zinc titanate pigment concentration of 40 volume percent.

The invention is further illustrated by the following examples.

Example I

Zinc titanate samples were prepared by the following procedure: zinc oxide (160 grams, "SP500" was slurried in 285 grams distilled water and the slurry was combined with a slurry of anatase titanium dioxide (80 grams) in 329 grams distilled water adjusted to pH 8 to 9 by addition of ammonium hydroxide. The mixture was slurried for 15 minutes and vacuum filtered. The resulting filter cake was spread on an aluminum sheet and dried at 100° C. for 3 hours in a forced air oven. The dried filter cake was broken into fine powder with a glass muller, and samples thereof were placed in a porcelain crucible and fired at temperatures from 800° C. to 1050° C. for varying times.

Reflectance spectra for each of the samples were determined by wet-spraying the sample on an aluminum substrate and measuring absolute spectral reflectance with an Edwards-type integrating sphere attached to a spectrophotometer. After measurement of its reflectance, each sample was extracted with a 10 percent acetic acid solution, and its reflectance was again determined. The zinc oxide content of each sample before and after extraction was determined analytically. The results obtained may be seen by reference to FIG. 1 in the drawings wherein the reflectance spectra at wavelengths from 0.3 to 0.6 micron are shown. The sample represented by curve A was fired at 800° C. for 3 hours, curve B at 800° C. for 3 hours and 900° C. for 2 hours, curve C 800° C. for 16 hours and curve D at 1050° C. for 18 hours. Curve E shows the reflectance for all of the samples after extraction with acetic acid. The zinc oxide content of each sample was as follows: A, 6 weight percent; B, 5 percent; C, 3 percent; and D, 2 percent. Extraction with acid (curve E) removed the zinc oxide. The improvement afforded by acetic acid extraction is clearly shown by the above data. Some improvement is obtained reflectance higher firing temperatures, but even at 1050° C. a distinct "step" remains at the lower edge of the spectrum. The higher reflectance obtained at these wavelengths produces substantial improvement in the performance of coatings pigmented with this material.

Example II

Figure 2:
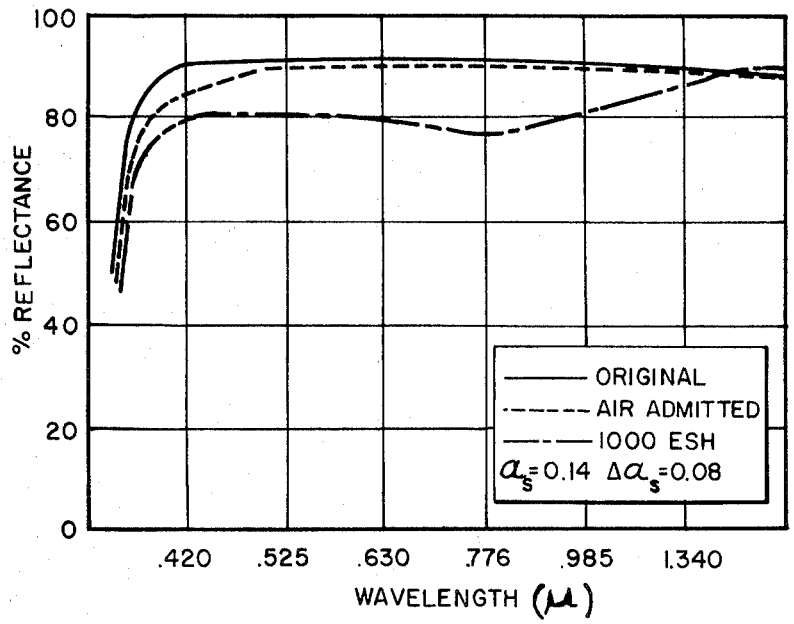
FIG. 2 is a graph showing the effect of ultraviolet radiation in vacuum on the reflectance of zinc titanate heated to 800°C.

The effect of ultraviolet radiation in vacuum on zinc titanate pigment prepared by the procedure of Example I, the pigment being fired at 800° C. for 14 hours and extracted with acetic acid, is shown in FIG. 2. Reflectance was determined for the pigment as prepared, after 1000 equivalent sun hours of ultraviolet radiation in vacuum, the second reflectance measurement being made in situ, and after admission of air to the irradiated sample. It may be readily seen that the relfectance of the irradiated sample was severely degraded, even though the sample had been extracted with acetic acid. Admission of air restored most of the reflectance lost by irradiation.

Example III

Figure 3:
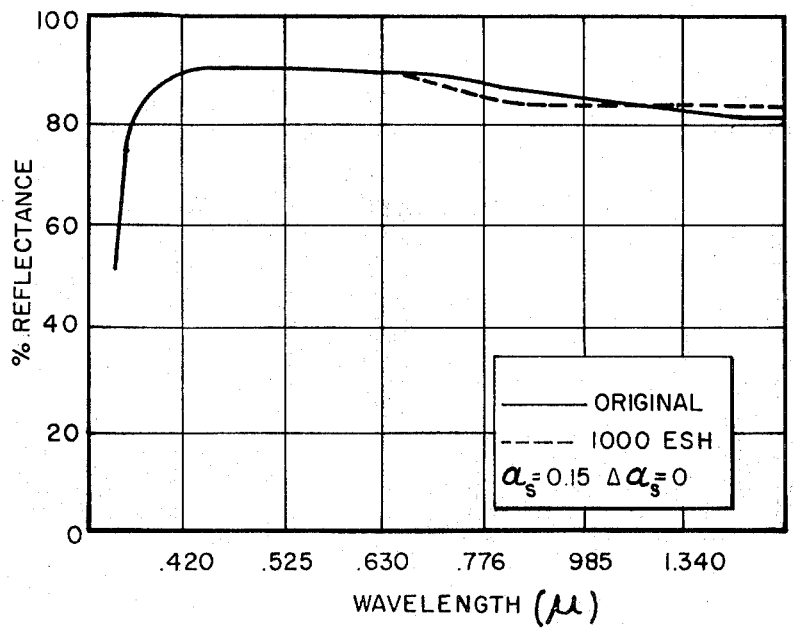
FIG. 3 is a graph showing the effect of ultraviolet radiation in vacuum on the reflectance of zinc titanate prepared in accordance with the present invention.

The effect of ultraviolet radiation in vacuum on zinc titanate pigment prepared by the procedure of Example I, the pigment being fired at 1050° C. for 14 hours and extracted with acetic acid, is shown in FIG. 3. Reflectance was determined for the pigment as prepared, and after 1000 equivalent sun hours of ultraviolet radiation in vacuum, the second reflectance measurements being made in situ. This sample was degraded very slightly and the reflectance loss at some wavelengths was compensated for by gains at other wavelengths. The results show that both a high firing temperature and acid extraction are essential to resistance to degradation.

The above examples are merely illustrative and are not to be understood as limiting the scope of the invention, which is limited only as indicated by the appended claims. it is also to be understood that although the invention is described with reference to coatings for space applications, pigments and coatings prepared in accordance with this invention can be used for other applications outside the space environment.

What is claimed is:

1. The method of preparing zinc titanate pigment which exhibits stable solar reflectance upon exposure to ultraviolet radiation in vacuum which comprises heating an intimate mixture of zinc oxide and anatase titanium dioxide at a molar ratio of 2:1 to a temperature of 800° C. to 950° C. whereby zinc-oxide-containing zinc titanate is formed, contacting the product thereof with an extractant solution in which zinc oxide is soluble and contacting the resulting zinc-oxide-free zinc titanate in a dispersed state with an inert gas stream at a temperature of 1000° C. to 1050° C. until said zinc titanate is completely converted to zinc orthotitanate.

2. The method of claim 1 wherein said extractant solution is an aqueous acetic acid solution.